(12) United States Patent
Unitt et al.

(10) Patent No.: US 6,915,079 B1
(45) Date of Patent: Jul. 5, 2005

(54) NON-RETURN OPTICAL STAR COUPLER

(75) Inventors: Brian Unitt, Bishops Stortford (GB); Michael Grant, Bishops Stortford (GB)

(73) Assignee: Nortel Networks, Ltd., St. Laurent (CA)

( * ) Notice: Subject to any disclaimer, the term of this patent is extended or adjusted under 35 U.S.C. 154(b) by 757 days.

(21) Appl. No.: 09/580,865

(22) Filed: May 30, 2000

(51) Int. Cl.[7] ............................................. H04J 14/08
(52) U.S. Cl. ......................... 398/99; 398/100; 398/66; 398/67; 398/68; 398/69; 398/70; 398/71; 398/72; 398/61; 398/63
(58) Field of Search ........................ 398/99, 100, 61, 398/63, 66, 67, 68, 69–72, 78

(56) References Cited

U.S. PATENT DOCUMENTS

| | | | | |
|---|---|---|---|---|
| 4,701,909 A | * | 10/1987 | Kavehrad et al. ............. 370/85 |
| 4,894,819 A | * | 1/1990 | Kondo et al. .................. 376/4 |
| 5,343,314 A | * | 8/1994 | Nakamura et al. .......... 359/123 |
| 5,854,700 A | * | 12/1998 | Ota ............................. 359/136 |
| 5,917,629 A | * | 6/1999 | Hortensius et al. ......... 359/136 |
| 6,411,410 B1 | * | 6/2002 | Wright et al. ............... 359/125 |
| 6,417,943 B1 | * | 7/2002 | Saraswat et al. ............ 359/123 |
| 6,417,944 B1 | * | 7/2002 | Lahat et al. ................. 359/124 |
| 6,445,472 B1 | * | 9/2002 | Kim et al. ................... 359/125 |
| 6,496,519 B1 | * | 12/2002 | Russell et al. .............. 370/465 |

* cited by examiner

Primary Examiner—Hanh Phan
(74) Attorney, Agent, or Firm—Barnes & Thornburg

(57) ABSTRACT

A passive optical star coupler, and associated method of operation arranged to transmit signals received at any input port to all output ports other than an output port associated with the input port. In this way all received signals are broadcast to all connected network equipment with the exception of the transmitting equipment.

10 Claims, 6 Drawing Sheets

NON-RETURN OPTICAL STAR COUPLER

FIELD OF THE INVENTION

The present invention relates to apparatus and related methods of operation for providing a high capacity passive optical network, and a system incorporating the same.

BACKGROUND TO THE INVENTION

This invention relates to fibre in the loop access networks, and in particular to fibre to the home (FTTH).

A characteristic of known FTTH networks is that customers tend to exist in groups situated geographically close to each other (say, within 200 meters), but the head end (or central office) may be some kilometers away for example, 5 km.

In networks where multiple nodes share a common medium, a multiple access protocol is needed to manage access to the medium such that individual nodes on the network can transmit their information successfully without interruption by transmission attempts from other nodes. Ethernet (IEEE standard 802.3) has adopted a 'Carrier Sense' with 'Collision Detection' protocol. When a node has data to transmit, it monitors the medium to check whether any other node is currently transmitting (Carrier Sense). If not, it is permitted to start transmission. Other nodes on the network might also start transmitting when they detect that the medium is free, but might not know of other nearly simultaneous transmissions by another node because of the inherent transmission delay of the medium. Simultaneous transmission results in a 'collision' which must be detected by all nodes simultaneously attempting to transmit. Once a collision is detected, each node ceases transmission and waits for a random time interval before sensing the medium and trying again.

Current implementations of Gigabit Optical Ethernet use point-to-point optical links to an 'unbuffered repeater' at the logical hub of the network. The repeater demodulates incoming signals from the point-to-point links and identifies a collision when optical activity occurs simultaneously on more than one input.

A disadvantage with this system is that it requires active electronics in the repeater which is not compatible with operator requirements to remove active electronics from street locations.

It is also known to use a passive optical star coupler to interconnect nodes in an optical network. A star coupler has a number of inputs and outputs where an optical signal on any input appears (attenuated) at all coupler outputs. Various techniques are known for constructing passive star couplers. One common technique is to interconnect a number of simpler fused fibre couplers, each having two inputs and two outputs, to form a larger matrix with the required functionality. For example, an eight by eight star coupler can be made up from 12 two by two couplers.

In a practical network, a coupler with an equal number of input and output ports, say eight input and eight output ports, would be used. Each node in the network connects to an input/output pair of ports. In this way, each node receives traffic sent by itself and all other nodes on the network. Carrier sense and collision detection can then be performed by each node to implement the multiple access protocol.

For collision detection to work properly it is desirable (in the case of Gigabit Ethernet, mandatory) that any collision should be detected before a transmitting node has finished the transmission. For high speed networks such as these using a passive optical star coupler, this results in a tradeoff between the physical size of the network and the minimum length of the transmitted packet. For a network running at a nominal bit rate of 1 Gbit/s and with an overall size of 5 km (typical of an access network) the minimum packet size to guarantee detection of a collision is around 6 kbytes.

A problem with this is that such a network is very inefficient for short packets, which must be extended to the minimum packet size to guarantee detection of any possible collisions. In practice, a significant proportion of packets (such as those used for voice and TCP/IP acknowledgements) will be short.

A further problem is that, the maximum permitted packet size on an Ethernet network is around 1500 bytes; any network including Ethernet segments cannot therefore use a larger packet size than this unless data is reformatted.

Collision detection also requires that any transmitter must be able to detect reliably when more than one node is transmitting simultaneously. In a network interconnected with a passive optical coupler, tolerances in the port to port coupler loss, differing attenuation in fibre connections between nodes and the passive coupler, and variations in node transmitter output powers combine to give a wide variation in optical signal level received at any node. It is then difficult to detect collisions, since a weak signal can be swamped by a strong one. Indeed, when practical tolerance levels are fully taken into account, it may not be possible to build a suitable receiver economically.

An earlier version of Ethernet, running at 10 Mbit/s, included an option to operate collision detection in the optical domain using a passive star coupler (known in the standard as '10baseFP'). In practice, this system is rarely used because of the difficulty of implementing a receiver capable of reliable collision detection. The problems associated with implementing such a receiver can be expected to be much more severe at a bit rate of 1 Gbit/s.

OBJECT OF THE INVENTION

The invention seeks to provide improved apparatus and method of operation for providing a high capacity passive optical network, and a system incorporating the same.

SUMMARY OF THE INVENTION

According to a first aspect of the present invention there is provided a passive optical network arrangement comprising:
 a head-end station;
 at least one subscriber station;
 a passive optical network providing optical connectivity from each of said stations to each other station;
wherein said subscriber stations are arranged to transmit on a common optical frequency distinct from that on which said head-end station is arranged to transmit, and each of said subscriber stations is arranged to detect when another of said subscriber stations is transmitting over said passive optical network.

Advantageously, upstream packet size in the arrangement is independent of the distance between the subscriber stations and the head station, though still dependent on the distance between subscriber stations. This allows the head-end to be situated distant from the subscriber stations whilst still allowing upstream collision detection among the outstations.

Advantageously, detection of collisions is performed by the subscriber stations rather than within the network connecting them, thereby avoiding the need for active collision detection within the connecting optical network.

Advantageously, the components of the network connecting the stations are passive, thereby obviating the need to provide power at any point between the head-end station and the subscriber stations.

Advantageously, such a multiple access network allows fibre and head-end equipment to be shared across groups of end customers, resulting in a more cost effective infrastructure. A network requiring only passive elements in outside locations would be more attractive, particularly to incumbent network operations who traditionally have not used active street equipment.

In a preferred embodiment, the subscriber station communicates with the head-end station using a carrier sense/collision detection protocol.

Preferably the protocol is an Ethernet protocol.

Most preferably, the protocol operation at bit rates of the order of 1 Gbit/s or above.

Advantageously, arrangements described are significantly more efficient than known alternative solutions and would therefore be more attractive to network operators.

Advantageously, the possibility of reusing existing technology designed for optical Gigabit Ethernet offers the opportunity of achieving shorter time to market than developing entirely new technology for the system.

Advantageously, use of Gigabit Ethernet allows use of existing 1high-volume chips, thereby reducing system manufacturing costs.

In one preferred embodiment, the passive optical network provides optical connectivity from each of said stations back to itself.

In such an arrangement, collision detection at a station involves a comparison between the newly sent signal and the received signal. A collision has occurred if the received signal incorporates a component arising from a signal transmitted by another station.

In a preferred embodiment, said passive optical network comprises;

a passive star coupler connected by means of point-to-point optical links to each of the stations.

Advantageously, the amount of optical fibre requirements for the network is minimised, and the interconnectivity between point-to-point links is provided in a single location.

In a preferred embodiment, the passive optical network provides no optical connectivity from each of said stations back to itself.

Advantageously, this allows considerable simplification of the collision detection apparatus in the outstations, since a collision is identifiable if any signal is received on the shared transmission frequency during transmission by the outstation.

Advantageously, the collision domain of the protocol is restricted to the subscriber stations, so that the constraint between protocol packet size and maximum physical distance between stations applies only to the subscriber stations—the head-end station is not restricted in that way.

Advantageously, this allows the head end to be at a considerably greater distance from each outstation compared with the distance between outstations, thereby affording a greatly enhanced reach for the network as a whole.

A telecommunications network comprising a passive optical network arrangement according to the foregoing aspect of the present invention.

According to a further aspect of the present invention there is provided an optical transceiver arrangement comprising:

a transmitter arranged to transmit data on a first optical frequency;

a transmission detector arranged to receive, on said first optical frequency, signals from a network indicative of a transmission by another subscriber station on said first frequency;

a medium access logic unit arranged to prevent transmission on said first frequency while said transmission detector is detecting said signals from a network indicative of a transmission by another subscriber station on said first frequency.

In a preferred embodiment, the transceiver further comprises:

a receiver arranged to receive data on a second optical frequency.

Advantageously, the transceiver may receive data on the second frequency independently of signals received on said first frequency.

In a preferred embodiment, the station comprises:

a common input port arranged to receive both said signal on said first optical frequency and said signal on said second frequency;

an optical frequency splitter arranged to provide said signal on said first frequency to said transmission detector and said signal on said second frequency to said receiver.

Advantageously, only a single input port is required, thereby reducing subscriber equipment and network cost.

In a preferred embodiment, said indication comprises any non-zero signal on said first optical frequency.

Advantageously, this reduces the complexity required in the transmission detector circuitry. In particular no complex circuitry is required to compare a recently transmitted signal with the received signal to determine whether the received signal is or is not indicative of a transmission by another subscriber station In a preferred embodiment, the transmission detector comprises a simple light detector. Preferably, the light detector comprises a PIN diode.

According to a further aspect of the present invention there is provided a passive optical network arrangement comprising:

a plurality of subscriber station;

a passive optical network providing optical connectivity from each of said stations to each other station;

wherein said subscriber stations are arranged to transmit on a common optical frequency, and each of said subscriber stations is arranged to detect when another of said subscriber stations is transmitting on said common optical frequency over said passive optical network, and in which the passive optical network comprises a non-return passive optical coupler according to the present invention.

Advantageously, this reduces size and cost of the subscriber station equipment.

The invention is also directed to a method by which the described apparatus operates and including method steps for carrying out every function of the apparatus.

In particular there is provided a method of operating a passive optical network arrangement comprising:

a head-end station;

at least one subscriber station;

a passive optical network providing optical connectivity from each of said stations to each other station;

comprising the steps of:

at least on of the subscriber station transmitting on an optical frequency common to the subscriber stations and distinct from that on which said head-end station is arranged to transmit;

at least one of the subscriber stations detecting when another of said subscriber stations is transmitting on said common optical frequency over said passive optical network.

There is also provided a method of operating an optical transceiver arrangement comprising:

transmitting data on a first optical frequency;

receiving, on said first optical frequency, signals from a network indicative of a transmission by another subscriber station on said first frequency;

preventing transmission on said first frequency while said transmission detector is detecting said signals from a network indicative of a transmission by another subscriber station on said first frequency.

The invention is also directed to signals generated by the described apparatus singly and in combination.

The preferred features may be combined as appropriate, as would be apparent to a skilled person, and may be combined with any of the aspects of the invention.

BRIEF DESCRIPTION OF THE DRAWINGS

In order to show how the invention may be carried into effect, embodiments of the invention are now described below by way of example only and with reference to the accompanying figures in which.

DETAILED DESCRIPTION OF INVENTION

Figure 1:
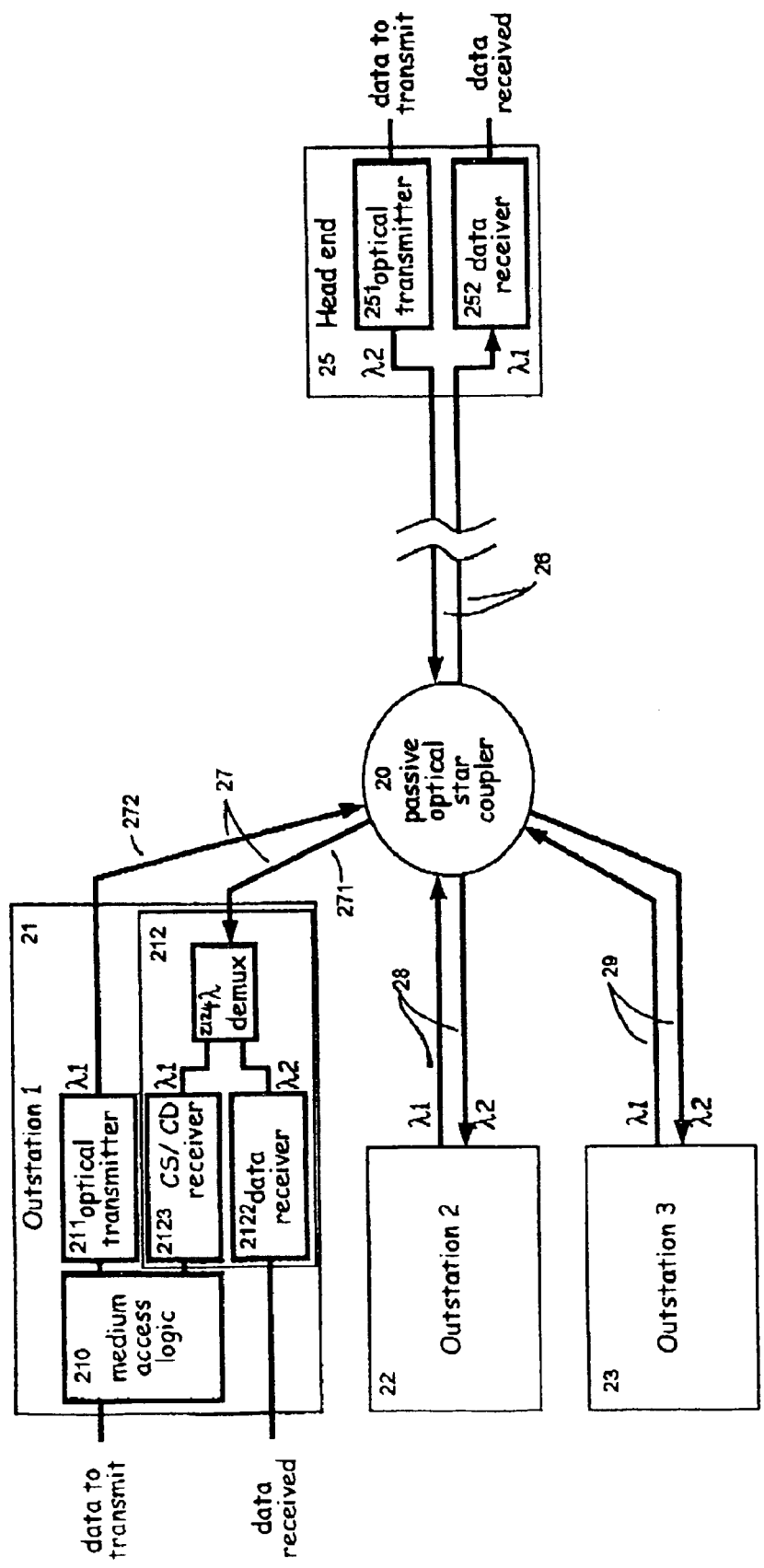
FIG. 1 shows a block diagram of a example of a system in accordance with the present invention.

Referring now to FIG. 1, there is shown a CS/CD network suitable for use as an access network, and comprising a single head end 25 connecting to a number of subscriber outstations 21–23 via a passive optical star coupler 20. Typically, the distance between any two outstations is assumed to be relatively small, perhaps 200 m, but the distance from the head end to the coupler may be much greater, for example up to around 5 km. The coupler may be located at a convenient point close to the subscribers' outstations (for example in a street cabinet) and, being a passive arrangement, requires no electrical power supply.

Each outstation comprises in optical transmitter 211 transmitting on frequency $\lambda 1$ and controlled by a medium access logic unit 210, and an optical receiver arrangement 212 arranged to receive signals on both frequency's $\lambda 1$ and $\lambda 2$.

The optical received arrangement may receive signals on both $\lambda 1$ and $\lambda 2$, and splits them by means of demux 2124, providing the data signal on $\lambda 2$ to a data receiver 2122, and signals indicative of collisions to a CS/CD receiver 2123.

When a given outstation has information to transmit, the outstation CS/CD receiver 2123 first monitors the incoming fibre 271 for optical activity from other outstations. If no such activity is present, the medium access logic 210 allows the transmission to start.

During a transmission, the outstation CS/CD receiver 2123 monitors the incoming connection for signal activity indicative of a collision. If a collision is detected, the medium access logic 210 ceases transmission and retries after a random time interval.

Upstream collisions are detected 252 at the head end by identifying and discarding incomplete or corrupted packets.

In the downstream direction, information transmitted from the head end is directed to all outstation data receivers 2122, each of which filters the packets based on addressing information in the packet header and passes relevant packets to the higher layers of the outstation system. Downstream transmissions may take place concurrently with upstream transmissions since the downstream path uses a different wavelength $\lambda 2$ from the upstream wavelength $\lambda 1$.

Various techniques are applicable to collision detection 2123, including the method specified in IEEE 802.3 for 10baseFP. As an alternative, which may be more straightforward to implement at the higher rates required for an optical Gigabit Ethernet, collision detection could also be performed by subtracting from the received signal 27 the signal 272 originating from the local transmitter 211.

The average optical power returned from the coupler as a result of emissions from the local transmitter can be expected to vary depending on the attenuation of the fibre path 27 between the outstation and the coupler, the loss between the coupler ports in use and the output power of the transmitting laser diode. However, for a given outstation, this average power level will remain relatively constant over an extended period of time. Likewise, the delay in the optical path between the transmitter and receiver in a particular outstation will also remain relatively constant over time. Each outstation can therefore predict the optical power level received due to operation of the local transmitter, and its timing. Thus a delayed and suitably attenuated average of the transmitted signal can be subtracted from the received signal in the electrical domain. Any residue (above a noise floor level) then indicates the presence of at least a second transmitted signal which must be the result of a collision. Successful transmissions, not involving a collision, can be used as measurement opportunities to reinforce or correct the local estimate of delay and returned signal level.

Optionally, the head end 25 can be connected to the star coupler 20 using a single optical fibre 26 (instead of a fibre pair) by adding wavelength multiplexers at each end of the fibre connection.

To increase the downstream capacity of the network, either initially or as an upgrade to an existing network, traffic in the downstream direction could use multiple wavelengths, each wavelength being detected at one or more outstations using wavelength selective filters installed either in the outstations or at the coupler site. In this way, an asymmetrical network is generated, having larger capacity in the downstream direction.

Figure 2:
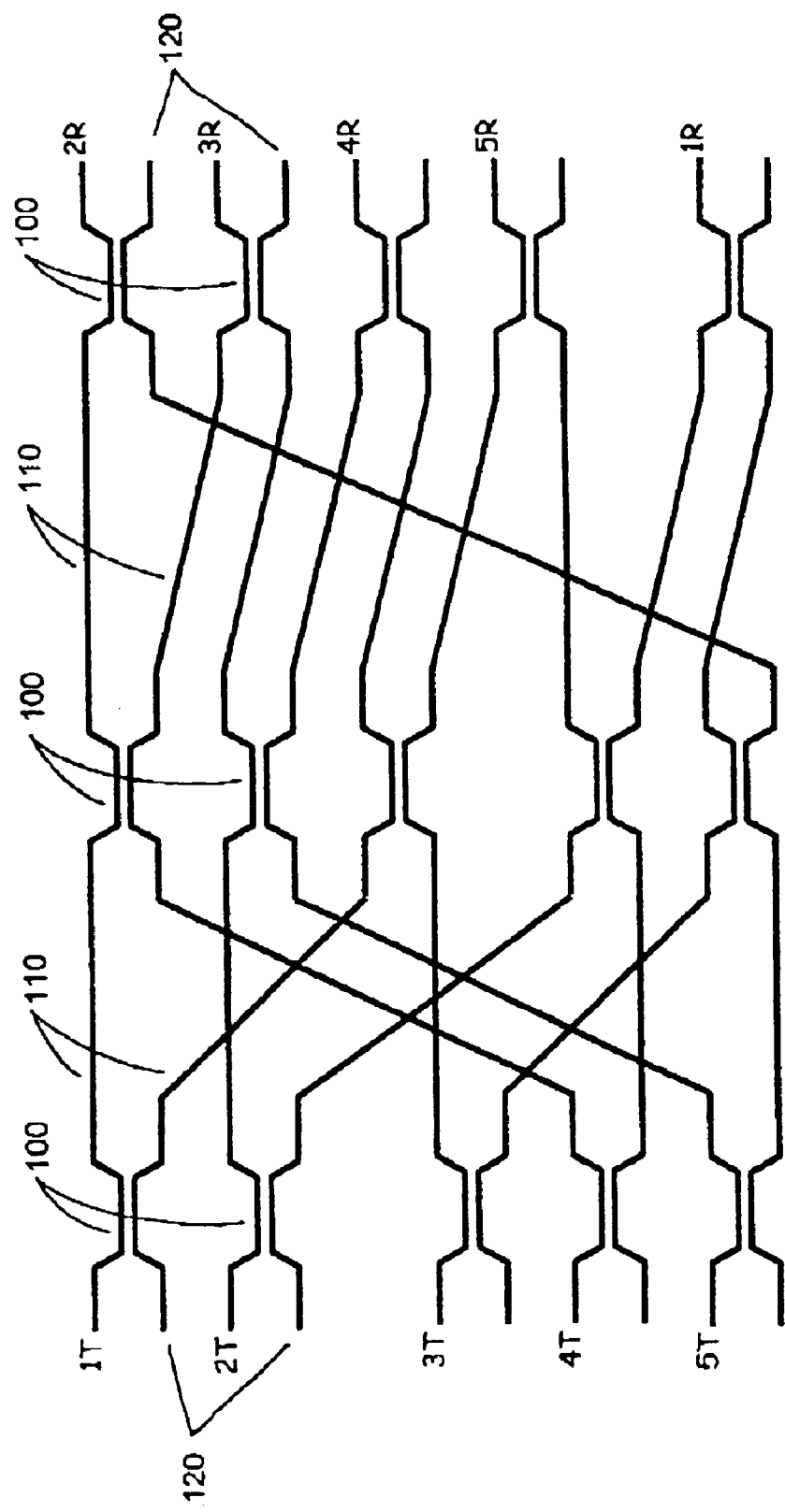
FIG. 2 shows a schematic diagram of a first example of a non-return optical coupler in accordance with the present invention.

Turning now to FIG. 2, there is shown a particularly preferred embodiment of a optical star coupler suitable for use in such an optical network.

The coupler has five receive ports 1R–5R and five corresponding transmit ports 1T–5T. The ports are logically paired so that, for example input 1R is paired with output 1T, 2R is paired with output 2T, etc. In many possible applications of the coupler, it is anticipated that such a pair of ports would be coupled to an optical fibre, or pair of fibres, leading to a single network equipment.

The receive ports are connected to transmit ports by means of a lattice arrangement of optical power loss splitters 100 and optical pathways 110 in such a way as to convey signals received at any given receive port to each transmit port other than the transmit port with which the receive port is paired. Each splitter will have a theoretical power of around 3 dB. The nature of the construction gives rise to a number of unused ports 120.

Where, as described above, a receive-transmit pair is coupled to single network equipment, this means that signals received from that equipment are broadcast to all other connected equipments, but not back to the originating equipment.

Figure 3:
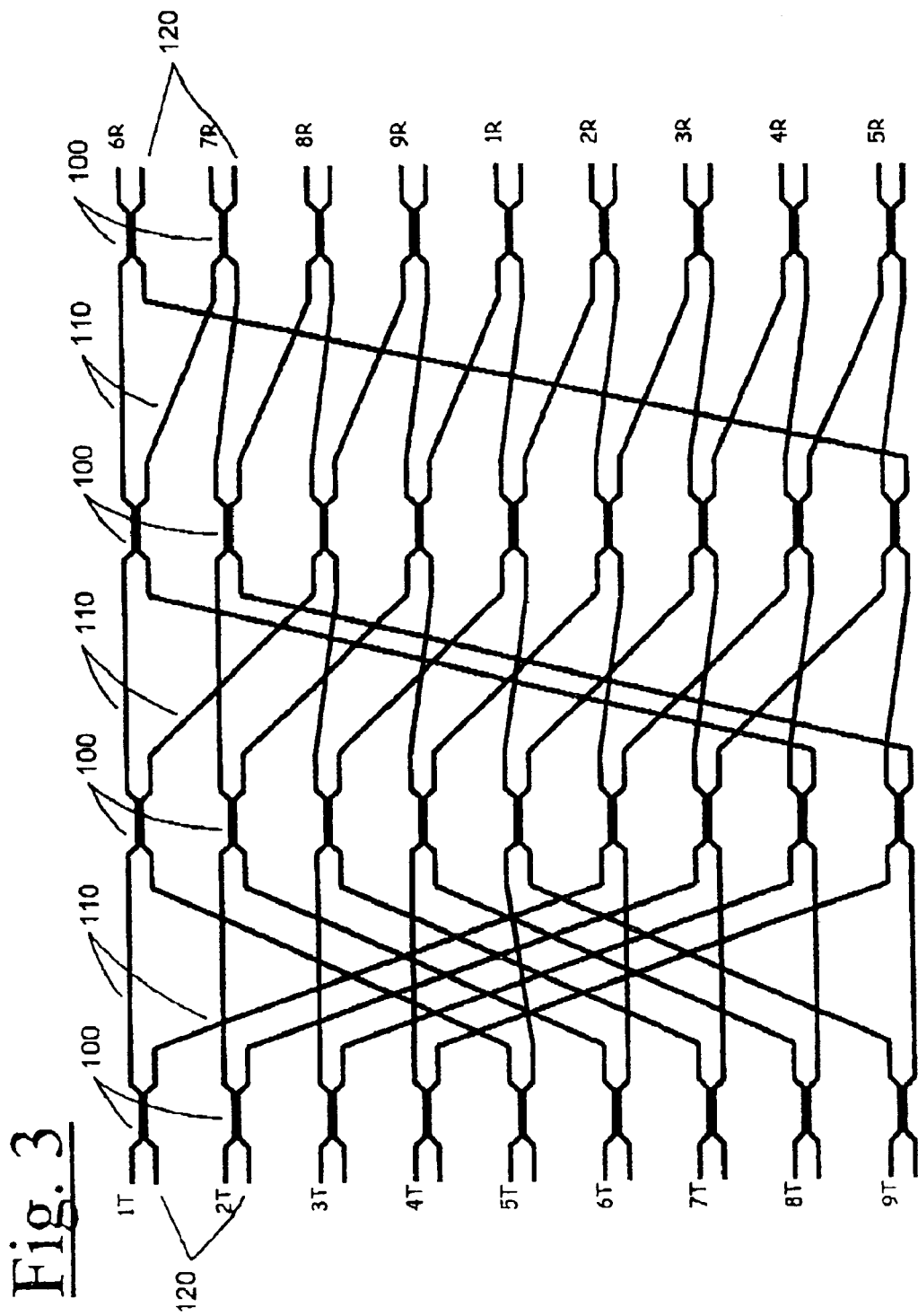
FIG. 3 shows a schematic diagram of a second example of a non-return optical coupler in accordance with the present invention.

Referring now to FIG. 3, there is shown a second star coupler, in this case supporting nine receive and transmit ports.

Preferred embodiments have 2"+1 port pairs, where n is an integer greater than or equal to 1, though for most envisaged applications, n will be at least 2.

FIGS. 2 and 3 each show how two by two fused fibre couplers can be arranged to construct larger couplers having the property that an optical signal on any input is directed to all output fibres, except to the output fibre corresponding to the active input—a 'non-return star coupler'.

Since a nodes's own transmitted optical signal is not returned by the coupler, any activity at the node's receiver can only result from transmissions from another node on the network. Thus, if any node detects optical activity whilst it is transmitting, then a collision has occurred. As a result, collision detection can be performed reliably by a much simpler receiver. For example, a simple light detector may be used comprising for example, a PIN diode.

Carrier sense works in the normal way.

Furthermore, since in such an arrangement only optical activity must be detected, rather than a specific bit pattern at the network operating bit rate, the optical receiver 2123 used for carrier sense and collision detection needs only a relatively low frequency response and can therefore be implemented more economically.

Figure 4:
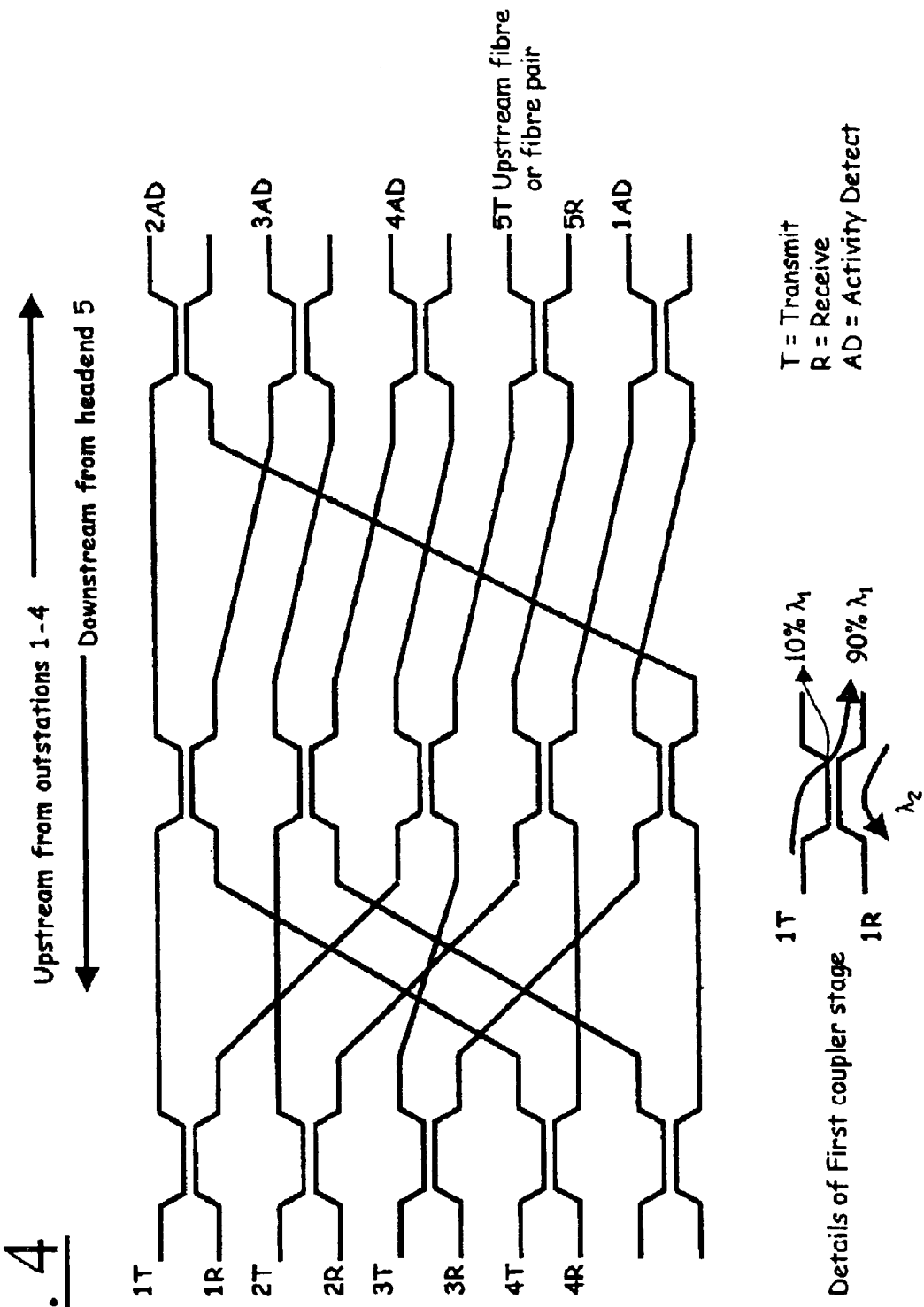
FIG. 4 shows an further embodiment of a star coupler arranged for 3-fibre working.

The non-return coupler embodiments described above typically have an additional 3 dB loss in excess of the intrinsic N-way splitting loss. In an alternative embodiment shown in FIG. 4, this excess loss is reduced to less than 0.5 dB, through the use of WDM and asymmetric splitting. This arrangement requires 3-fibre working—1 fibre for upstream traffic, one for downstream traffic, and a third collision detect—to each subscriber station. The headend path does not require collision detection, since WDM is used to remove it from the collision detect domain.

In this arrangement, the optimised coupler has a large asymmetric split applied to the upstream wavelength, directing the largest proportion (for example 90%) of the transmit power from an outstation towards the output fibre 5R directed towards the headend. As a result, the "Activity Detect fibre outputs" 1AD–4AD will carry varying signal levels (derived from 90% or 10% splits of the original outstation transmit levels) dependant upon which outstation is transmitting. This difference in signal levels is not a problem since the activity detect threshold will be set to a value less than the minimum attenuated outstation signal level expected.

All other couplers in the arrangement may be standard symmetrical 3 dB couplers.

Figure 5:
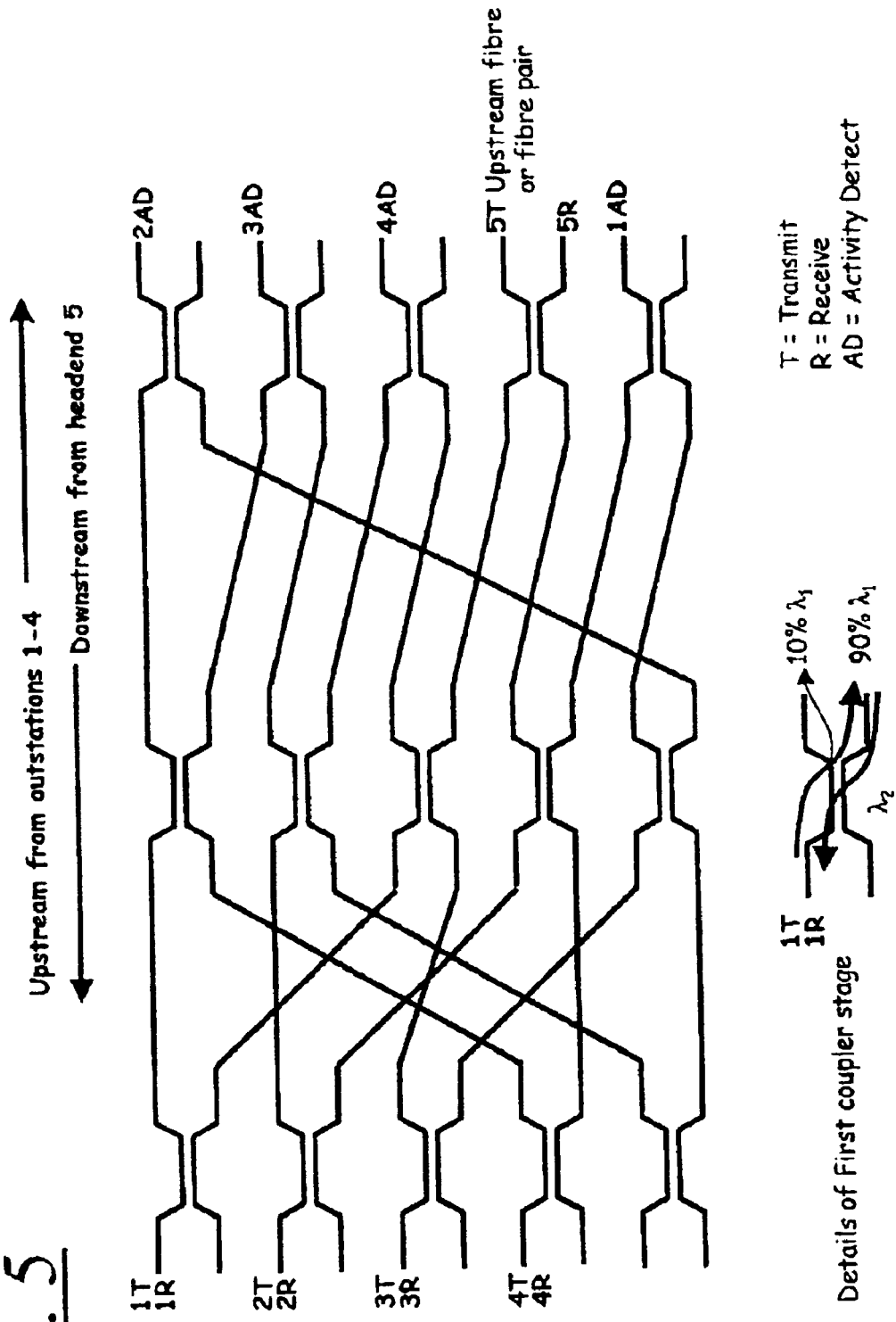
FIG. 5 shows a still further embodiment of a star coupler arranged for 2-fibre working.

In a still further embodiment of a non-return star coupler, shown in FIG. 5, the fiber count on paths to the outstations is reduced to two fibres—one for transmit/receive, and one for Activity Detect. In PON arrangements using such star coupler, an additional WDM component is required in each outstation to separate the upstream and downstream wavelengths.

Note that in Access Network Arrangements using either of these two embodiments, the upstream direction can utilise either 2-fibre working or single fibre working with WDM split at the headend, since each fibre carries all upstream traffic.

Figure 6:
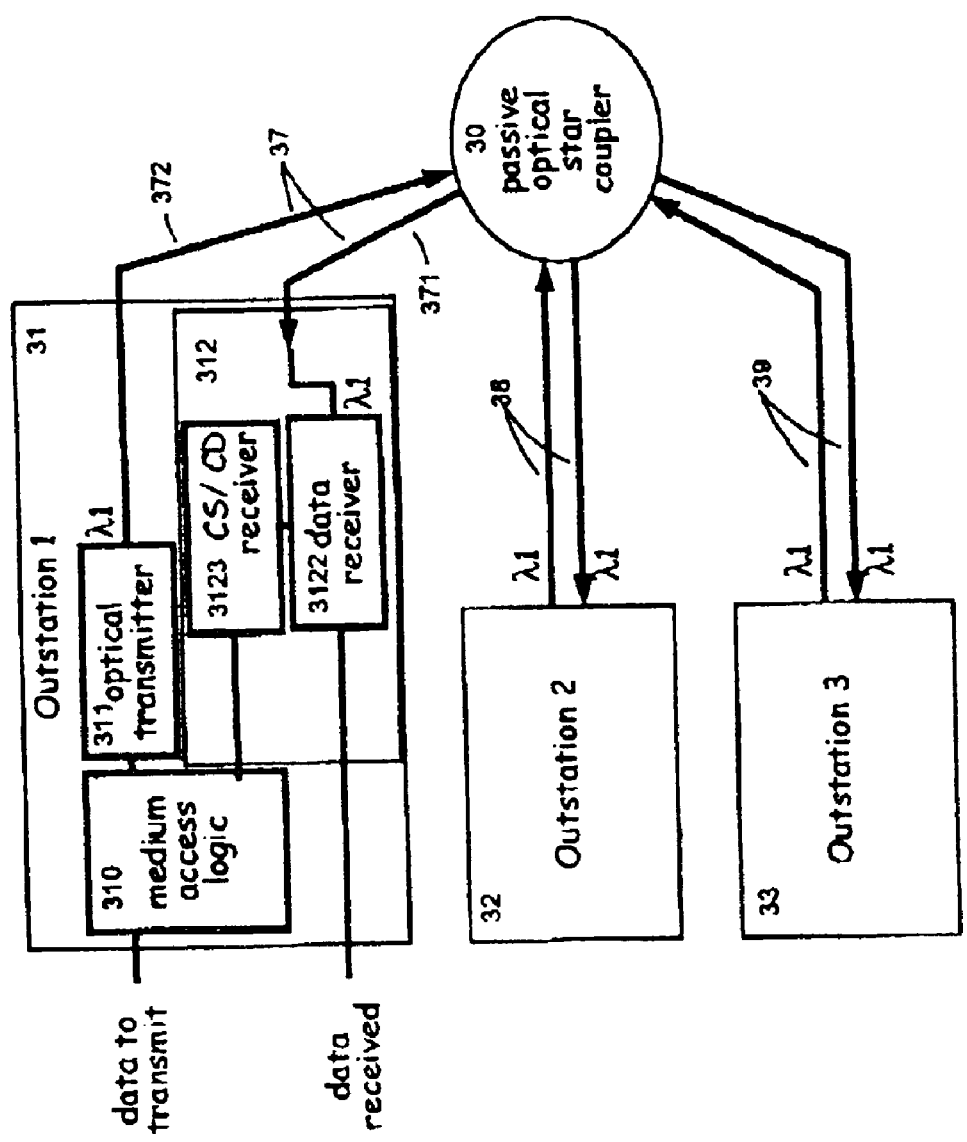
FIG. 6 shows a block diagram of an example of a further system arranged to make use of a non-return optical coupler.

Referring now to FIG. 6, there is shown a further embodiment of a CS/CD network suitable for use as an access network, and comprising a number of subscriber outstations 31–33 connectors via a non-return passive optical star coupler 30. Typically, the distance between any two outstations is assumed to be relatively small, perhaps 200 m. The coupler may be located at a convenient point close to the subscribers' outstations (for example in a street cabinet) and, being a passive arrangement, requires no electrical power supply.

Each outstation comprises an optical transmitter 311 transmitting on frequency $\lambda 1$ and controlled by a medium access logic unit 310, and an optical receiver arrangement 312 arranged to receive signals on the same frequency, $\lambda 1$.

The optical receiver arrangement is arranged to receive signals on $\lambda 1$ at a data receiver 3122 and translates the received signals to the electrical domain. Dat asignals are then forwarded to the local node for further processing whilst a copy is passed to the CS/CD receiver 3123. Any signal received in this arrangement is indicative of another station transmitting.

When a given outstation has information to transmit, the outstation CS/CD receiver 3123 first monitors the incoming fibre 371, via receiver 3122, for optical activity from other outstations. If no such activity is present, the medium access logic 310 allows the transmission to start.

During a transmission, the outstation CS/CD receiver 3123 monitors the incoming connection for signal activity indicative of a collision. If a collision is detected, the medium access logic 310 ceases transmission and retries after a random time interval.

Information transmitted from each outstation is directed to all outstation data receivers 3122, each of which filters the packets based on addressing information in the packet header and passes relevant packets to the higher layers of the outstation system.

As in the embodiment of FIG. 1, since a node's own transmitted optical signal is not returned by the coupler, any activity at the node's receiver can only result from transmissions from another node on the network. Thus, if any node detects optical activity whilst it is transmitting, then a collision has occurred. As a result, collision detection can be performed reliably by a much simpler receiver. For example, a simple light detector may be used comprising for example, a PIN diode.

Carrier sense works in the normal way.

Furthermore, since in such an arrangement only any signal activity must be detected, rather than a specific bit pattern at the network operating bit rate, the receiver 2123 used for carrier sense and collision detection needs only a relatively low frequency response and can therefore be implemented more economically.

In summary this invention allows, inter alla, an access network to be built where the head end equipment and much of the fibre infrastructure can be shared between a number of end customers. The transmission efficiency is significantly increased by restricting the geographical span of the multiple access collision domain. This is achieved without requiring active electronic equipment in street locations. Further, the passive star coupler is expected to be highly reliable, so easy physical access is also not required. The multiple access protocol can be similar to that used for Gigabit Ethernet, offering the possibility of reusing existing technology.

Any range or device value given herein may be extended or altered without losing the effect sought, as will be apparent to the skilled person for an understanding of the teachings herein.

What is claimed is:

1. A passive optical network arrangement comprising:
   a head-end station;
   a plurality of subscriber stations;
   a passive optical network providing optical connectivity from each of said stations to each other station;
   wherein each of said plurality of subscriber stations is arranged to transmit on a common optical wavelength $\lambda 1$ distinct from the wavelength $\lambda 2$ on which said head-end station is arranged to transmit, and each of said plurality of subscriber stations is arranged to detect when another of said subscriber stations is transmitting on said common optical wavelength $\lambda 1$ over said passive optical network, and in which the passive optical network comprises a passive optical coupler comprising a plurality of port pairs, each port pair comprising an input port and a corresponding output port; wherein each input port is coupled to all output ports other than its corresponding output port.

2. A passive optical network arrangement according to claim 1 in which each of the plurality of subscriber stations communicates with the head-end station using a carrier sense/collision detection protocol.

3. A passive optical network arrangement according to claim 2 in which the protocol operates at bit rates in the order of 1 Gbit/s or above.

4. A passive optical network arrangement according to claim 1 in which said passive optical network comprises:
   a passive star coupler connected by means of point-to-point optical links to each of the stations.

5. A passive optical network arrangement according to claim 1, wherein the passive optical coupler comprises an arrangement of optical power splitters and optical pathways connecting said port pairs, said splitters and pathways being arranged such that a signal transmitted to an input port is not returned by the coupler to its corresponding output port but is conveyed to all other output ports.

6. A passive optical network arrangement according to claim 5, wherein the optical power splitters of the passive optical coupler are arranged to apply a large asymmetric power split to an outputted upstream wavelength $\lambda 1$ signal directing the largest portion of the split optical power signal towards an input port of the head-end station.

7. An optical transceiver arrangement for a passive optical network arrangement including a passive optical coupler comprising a plurality of port pairs, each port pair comprising an input port and a corresponding output port;
   wherein each input port is coupled to all output ports other than its corresponding output port, said transceiver arrangement comprising:
   a transmitter arranged to transmit data on a first optical frequency;
   a transmission detector arranged to receive, on said first optical frequency, signals from a network indicative of a transmission by another subscriber station on said first frequency;
   a medium access logic unit arranged to prevent transmission on said first frequency while said transmission detector is detecting said signals from a network indicative of a transmission by another subscriber station on said first frequency;
   a receiver arranged to receive data on a second optical frequency;
   a common input port arranged to receive both said data transmitted on a first optical frequency and said data on a second optical frequency; and
   an optical frequency splitter arranged to provide said data transmitted on a first optical frequency to said transmission detector and said data on a second optical frequency to said receiver.

8. An optical transceiver arrangement according to claim 7 in which the transmission detector comprises a simple light detector.

9. An optical transceiver arrangement according to claim 8 in which the light detector comprises a PIN diode.

10. A method of operating a passive optical network arrangement having a head-end station, a plurality of subscriber stations, and a passive optical network providing optical connectivity from each of said stations to each other station; the method comprising the steps of:
   at one of said plurality of subscriber stations transmitting a signal on an optical frequency common to said subscriber stations and distinct from that on which said head-end station is arranged to transmit, said signal being transmitted to a passive optical coupler comprising an input port and a corresponding output port; wherein each input port is coupled to all output ports other than its corresponding output port; and
   at one of said plurality of subscriber stations detecting when another of said subscriber stations is transmitting on said common optical frequency over said passive optical network.

* * * * *